United States Patent
Zhang et al.

(10) Patent No.: US 9,264,885 B2
(45) Date of Patent: Feb. 16, 2016

(54) METHOD AND SYSTEM FOR MESSAGE TRANSMISSION CONTROL, METHOD AND SYSTEM FOR REGISTER/UPDATE

(75) Inventors: Shiwei Zhang, Shenzhen (CN); Tao Fu, Shenzhen (CN); Qiang Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 720 days.

(21) Appl. No.: 13/393,409

(22) PCT Filed: Aug. 12, 2010

(86) PCT No.: PCT/CN2010/075935
§ 371 (c)(1),
(2), (4) Date: Feb. 29, 2012

(87) PCT Pub. No.: WO2011/032442
PCT Pub. Date: Mar. 24, 2011

(65) Prior Publication Data
US 2012/0166612 A1    Jun. 28, 2012

(30) Foreign Application Priority Data

Sep. 17, 2009 (CN) .......................... 2009 1 0174697

(51) Int. Cl.
*G06F 15/173* (2006.01)
*H04W 8/18* (2009.01)
(Continued)

(52) U.S. Cl.
CPC .............. *H04W 8/18* (2013.01); *H04L 63/0236* (2013.01); *H04L 63/101* (2013.01); *H04W 12/08* (2013.01)

(58) Field of Classification Search
CPC . H04L 63/0236; H04L 63/101; H04W 12/08; H04W 8/18
USPC .......................................................... 709/223
See application file for complete search history.

(56) References Cited

U.S. PATENT DOCUMENTS 5,570,366 A * 10/1996 Baker et al. .................. 370/312
6,804,720 B1 * 10/2004 Vilander et al. .............. 709/229
(Continued)

FOREIGN PATENT DOCUMENTS

| CN | 1794761 A | 6/2006 |
| CN | 101335788 A | 12/2008 |
| WO | 2008112482 A | 9/2008 |

OTHER PUBLICATIONS

International Search Report for PCT/CN2010/075935 dated Nov. 11, 2010.

*Primary Examiner* — Waseem Ashraf
(74) *Attorney, Agent, or Firm* — Banner & Witcoff, Ltd.

(57) ABSTRACT

A message transmission control method, including: a location node storing a message transmission control list of a terminal node; after the terminal node registers to an access node, the access node requesting the location node to send the message transmission control list of the terminal node; the location node searching for the message transmission control list of the terminal node, and sending to the access node; and after receiving the message transmission control list of the terminal node, the access node filtering data messages sent to the terminal node according to the message transmission control list. The present invention also provides a message transmission control system, and a register/update method and system. The control of the message transmission control list in the present invention is implemented in the access server of the wireless network, thus to avoid the wireless resource waste and the subscriber charge loss.

18 Claims, 2 Drawing Sheets

(51) Int. Cl.
*H04L 29/06* (2006.01)
*H04W 12/08* (2009.01)

(56) References Cited

U.S. PATENT DOCUMENTS

| | | | |
|---|---|---|---|
| 7,502,615 B2* | 3/2009 | Wilhoite et al. | 455/442 |
| 7,664,507 B2* | 2/2010 | Tamura et al. | 455/450 |
| 2005/0009545 A1* | 1/2005 | Axelsson | H04W 48/04 455/502 |
| 2006/0133320 A1* | 6/2006 | Kim et al. | 370/331 |
| 2006/0135132 A1* | 6/2006 | Cai | H04L 12/585 455/414.1 |
| 2006/0184530 A1* | 8/2006 | Song et al. | 707/9 |
| 2006/0187858 A1* | 8/2006 | Kenichi | H04W 36/08 370/254 |
| 2006/0245373 A1* | 11/2006 | Bajic | 370/254 |
| 2009/0059935 A1* | 3/2009 | Dec | 370/401 |
| 2009/0233601 A1* | 9/2009 | Vikberg et al. | 455/436 |
| 2010/0008341 A1* | 1/2010 | Ulupinar et al. | 370/338 |
| 2010/0069098 A1* | 3/2010 | Mahajan | H04L 63/101 455/466 |
| 2010/0167694 A1* | 7/2010 | Chiussi | H04L 67/30 455/411 |
| 2010/0234017 A1* | 9/2010 | Lim et al. | 455/426.1 |
| 2011/0002341 A1* | 1/2011 | Damola et al. | 370/401 |
| 2011/0055902 A1* | 3/2011 | Brodfuehrer | G06F 21/604 726/4 |
| 2011/0083169 A1* | 4/2011 | Moeller et al. | 726/5 |
| 2011/0093913 A1* | 4/2011 | Wohlert et al. | 726/1 |
| 2011/0164504 A1* | 7/2011 | Bothos et al. | 370/237 |
| 2011/0201331 A1* | 8/2011 | Jha | H04L 63/101 455/433 |

* cited by examiner

METHOD AND SYSTEM FOR MESSAGE TRANSMISSION CONTROL, METHOD AND SYSTEM FOR REGISTER/UPDATE

TECHNICAL FIELD

The present invention relates to the field of mobile communication technologies, and more particularly, to a method and system for message transmission control and a register/update method and system.

BACKGROUND OF THE RELATED ART

As the mobile communication network is more and more widely applied, people use more frequently the mobile packet data service. As the wireless resources are scarce, the packet data service in the mobile communication system generally uses two-way charging, that is, both the flows of the mobile terminal receiving data messages from the network and sending data messages to the network (hereafter respectively referred to as downlink and uplink data) belong to the range of charging.

In the case of two-way charging, if there are other data subscribers maliciously sending junk data to a specific mobile terminal, the mobile terminal must pay for the junk data at the same time of suffering from the interference of the junk data, something that is intolerant for the subscribers. If no measures are taken to prevent this from happening, it may cause charge disputes and reduce the operator's network quality of service satisfaction.

Even if the operator does not charge the downlink flow, a lot of junk data still take up wireless bandwidth and reduce network operating efficiency and the capacity. Therefore, for wireless communication networks, the prevention of junk data has become common needs of the operators and the subscribers.

In data transmission, using the black lists to restrict data forwarding is a common means to prevent the transmission of the junk data, and the implementation of many black lists is currently done in the mobile terminal. Although such measures reduce the transmission of the junk data, but it cannot solve the problem of wireless bandwidth waste and subscriber charge loss. In addition, generally only high-end mobile terminal can implement the black lists, therefore, it needs to replace or upgrade the mobile terminal to prevent the transmission of the junk data. It can be seen that in the wireless communication systems, the prevention of the junk data is best implemented at the network side, thus to avoid the subscriber charge loss and wireless resource waste caused by the network based attacks.

However, for mobile communication systems, since the mobile terminal may roam and hand over, the access points also change due to the roaming and handover of the mobile terminal, therefore, the same access server cannot be fixedly used in the mobile data network to process the black lists, and a new mechanism is needed for black lists processing.

Currently, there are the following kinds of common methods for black lists processing:

first, black list control based on the terminal:

the black list control based on the terminal places the control points of the black lists in the mobile terminal, that is, when the junk data is sent to the mobile terminal, the mobile terminal detects and filters the source address of the data message based on the black lists set by the subscriber, and if the source address is found in the black lists, the data message is discarded.

With this method, the subscriber must purchase the terminal that supports black list filtering, which requires additional investment. In addition, when the terminal is used to refuse the junk data messages, the terminal cannot detect or discard the data messages until the junk data message or information is transmitted to the terminal, but at this point, the wireless bandwidth has been wasted, and the network has already charged the flow of the junk data. Therefore, the black list control in the terminal has defects such as flow charge loss, wireless resource waste and the increased investment in replacement of the terminal, and it has great application limitations.

Second, black list control based on the short message center:

In addition, there are some methods to prevent junk short messages, this kind of methods usually uses the short message center to achieve the junk information filtering, but, since the packet data flow does not actually go through the short message center, the short message center cannot be used to prevent malicious mobile packet data.

Third, unified black list control:

the unified black list control means to establish a unified black list in network devices and implement a unified black list control to all the subscribers. If the data of a subscriber in the black list is detected, the data is discarded. This control method does not distinguish the black list according to the needs of each subscriber, and it may either block or accept all. However, for the data messages from the same source, they may be junk data for one subscriber but useful data for another subscriber. Therefore, using the unified black list method cannot meet the special requirements of a single subscriber for shielding the junk data.

In addition, using the unified black list further brings the problem of black list update. If the black list is only added but not deleted, there may be so many black lists that the search efficiency is affected when forwarding the data messages, but if the black list is improperly removed, it will cause the attacker to strike again.

Fourth, the method for identifying the junk data and generating the black list:

There may be other methods for describing how to identify the junk information and generate the black list, whose emphasis is to automatically identify the malicious flow, and then extract the black list, but it does not consider how to control based on the black list. Such methods are often combined with the unified black list method to protect the network device from attacks, but it is difficult to ensure that a single subscriber device is not attacked.

Fifth, short message routing black list control based on the Home Subscriber Server (HSS):

Chinese patent application publication description CN200510137703 proposes a method of "storing anti-spam black list". It is proposed that the Home Location Register (HLR) or HSS stores the black list, and when the message sent from the spammers is sent to the gateway, the gateway queries the HLR or HSS where the called party is located for the current roaming address of the called party, wherein, when querying the location server for the roaming address, the gateway carries the caller identifier and the called identifier. The HLR or HSS compares whether the calling address is in the called black list or not, if yes, directly reject the routing request, and do not give the routing information.

This method is relatively suitable for the processing of sending short message, but not for processing the packet data service, and it has the following problems:

1) this method requires the gateway to query the location server when forwarding each short message, which can not be implemented in the mobile packet data service. Since the data amount of the packet data service is large, if the gateway has to query the location server after receiving each IP data message, it will seriously degrade the data forwarding performance and substantially increase the load of the location server. In practical applications, the calling gateway often uses the first packet query, that is, only queries the location server about the routing of the called party when receiving the first IP data message, and then remembers the routing data of the called party, and in the subsequent process, when the gateway receives the data messages sent from the calling party to the called party, it does not query the location server about the routing but directly sends the data. Thus, when the called party detects the attack from the calling party, even if the called party adds the attacker into its own black list in the location server, since the gateway in which the attacker is located has already owned the routing information of the called party, it does not query the location server any more, thus the malicious attack cannot be terminated.

2) When there are a lot of caller subscribers in a gateway accessing to the same called network, for example, a lot of subscribers visit the Google webpage, if the gateway receives the Google access request from each caller, the gateway must reinitiate the routing query, which is clearly inefficient. The most common processing method is to store the routing information of the called party to be used for all subscribers. The location server (LS) records the black list, and the subscribers are required to query the LS for each packet, which is unreasonable and inefficient for the IP-based network.

3) When the called party removes the black list restriction on the calling party, since the called location does not store the routing information of the calling party, and the gateway does not query the location server about the routing information of the called party, the gateway cannot remove the restriction on the calling party in time, which will affect the quality of service.

In summary, the existing black list technologies cannot be applied to the mobile packet data service.

SUMMARY OF THE INVENTION

The technical problem to be solved in the invention is to provide a message transmission control method and system and a register/update method and system, to control the data sent to subscribers.

To solve the above problem, the present invention provides a message transmission control method, comprising:

a location node storing a message transmission control list of a terminal node;

after the terminal node registers to an access node, the access node requesting the location node to send the message transmission control list of the terminal node;

the location node searching for the message transmission control list of the terminal node, and sending to the access node; and after receiving the message transmission control list of the terminal node, the access node filtering data messages sent to the terminal node according to the message transmission control list.

To solve the aforementioned problem, the present invention also provides a message transmission control system, comprising: a terminal node, an access node and a location node, wherein:

the location node is set to: store a message transmission control list of the terminal node, and after receiving a request from the access node, search for the message transmission control list of the terminal node, and send to the access node;

the access node is set to: after the terminal node finishes registration, request the location node to send the message transmission control list of the terminal node; and after receiving the message transmission control list of the terminal node, filter data messages sent to the terminal node according to the message transmission control list.

To solve the aforementioned problem, the present invention also provides a network access device, which comprises:

a terminal node registering module, which is set to: complete the registration of the terminal node;

a transmission requesting module, which is set to: after the terminal node finishes the registration, request a location node which stores a message transmission control list of the terminal node to send the message transmission control list of the terminal node; and a receiving filtering module, which is set to: after receiving the message transmission control list of the terminal node, filter data messages sent to the terminal node according to the message transmission control list.

To solve the aforementioned problem, the present invention also provides a message transmission control method, used to achieve message transmission control between a first terminal node and a second terminal node, wherein, the first terminal node registers to a first access node, and the second terminal node registers to a second access node, the method comprising:

the first terminal node sending a first message to the second terminal node via the first access node, and the first message comprises at least a first terminal node identification and a second terminal node identification;

the first access node receiving the first message and forwarding the first message to the second access node according to the second terminal node identification; and the second access node querying a message transmission control list set by the second terminal node according to the second terminal node identification, and querying whether the first terminal node identification exists in the message transmission control list or not according to the first terminal node identification, and determining whether to send the first message to the second terminal node or not based on the query results.

To solve the aforementioned problem, the present invention also provides a message transmission control system, comprising a first terminal node, a second terminal node, a first access node and a second access node; the system used to achieve message transmission control between the first terminal node and the second terminal node, and the first terminal node registering to the first access node, and the second terminal node registering to the second access node, wherein:

the first terminal node is set to: send a first message to the second terminal node via the first access node, and the first message comprises at least a first terminal node identification and a second terminal node identification;

the first access node is set to: receive the first message and forward the first message to the second access node according to the second terminal node identification;

the second access node is set to: query a message transmission control list set by the second terminal node according to the second terminal node identification, and query whether the first terminal node identification exists in the message transmission control list or not according to the first terminal node identification, and determine whether to send the first message to the second terminal node or not based on the query results.

To solve the aforementioned problem, the present invention also provides a network access device, used to achieve message transmission control between a first terminal node and a second terminal node, and the network access device is set to:

when the first terminal node registers to the network access device, receive a first message sent by the first terminal node to the second terminal node via the network access device, wherein, the first message comprises at least a first terminal node identification and a second terminal node identification, and forward the first message to the network access device to which the second terminal node registers according to the second terminal node identification;

when the second terminal node registers to the network access device, receive the first message sent from the network access device to which the first terminal node registers, query a message transmission control list set by the second terminal node according to the second terminal node identification, and query whether the first terminal node identification exists in the message transmission control list or not according to the first terminal node identification, and determine whether to send the first message to the second terminal node or not based on the query results.

To solve the aforementioned problem, the present invention also provides a message transmission control method, used to achieve message transmission control between a first terminal node and a second terminal node, wherein, the first terminal node registers to a first access node, the second terminal node registers to a second access node, and the second terminal node sets a message transmission control list at a first location node, and the method comprises:

the first terminal node sending a first message to the second terminal node via the first access node, wherein, the first message comprises at least a first terminal node identification and a second terminal node identification;

the first access node receiving the first message and forwarding the first message to the second access node according to the second terminal node identification, or the first access node receiving the first message and forwarding a second message to the second access node according to the second terminal node identifier after updating the first message to the second message; and the second access node querying the message transmission control list set by the second terminal node according to the second terminal node identification, and querying whether the first terminal node identification exists in the message transmission control list or not according to the first terminal node identification, and determining whether to send the first message to the second terminal node or not based on the query results, or determining whether to send the second message to the second terminal node or not based on the query results, wherein, the message transmission control list of the second access node is obtained from the first location node.

To solve the aforementioned problem, the present invention also provides a message transmission control system, comprising a first terminal node, a second terminal node, a first access node, a second access node and a first location node; the system used to achieve message transmission control between the first terminal node and the second terminal node, and the first terminal node registering to the first access node, the second terminal node registering to the second access node, and the second terminal node setting a message transmission control list in the first location node, wherein:

the first terminal node is set to: send a first message to the second terminal node via the first access node, wherein, the first message comprises at least a first terminal node identification and a second terminal node identification;

the first access node is set to: receive the first message and forward the first message to the second access node according to the second terminal node identification; or the first access node is set to receive the first message and update the first message to a second message, forward the second message to the second access node according to the second terminal node identification;

the second access node is set to: query the message transmission control list set by the second terminal node according to the second terminal node identification, and query whether the first terminal node identification exists in the message transmission control list or not according to the first terminal node identification, and determine whether to send the first message to the second terminal node or not based on the query results, or determine whether to send the second message to the second terminal node or not based on the query results, wherein, the message transmission control list of the second access node is obtained from the first location node.

To solve the aforementioned problem, the present invention also provides a message transmission control method used to achieve the message transmission control between the first terminal node and the second terminal node, wherein, the first terminal node and the second terminal node register to a same access node, and the second terminal node sets a message transmission control list in a first location node, and the method comprises:

the first terminal node sending a first message to the second terminal node via the access node, wherein, the first message comprises at least a first terminal node identification and a second terminal node identification; and the access node receiving the first message, and querying the message transmission control list set by the second terminal node according to the second terminal node identification, and querying whether the first terminal node identification exists in the message transmission control list or not according to the first terminal node identification, and when the query result is yes, not sending the first message to the second terminal node;

wherein, the message transmission control list is acquired from the first location node.

To solve the aforementioned problem, the present invention also provides a message transmission control system, comprising a first terminal node, a second terminal node, an access node, and a first location node; the system used to achieve message transmission control between the first terminal node and the second terminal node, and the first terminal node and the second terminal node registering to a same access node, and the second terminal node setting a message transmission control list in the first location node, wherein:

the first terminal node is set to: send a first message to the second terminal node via the access node, wherein, the first message comprises at least a first terminal node identification and a second terminal node identification;

the access node is set to: receive the first message, query the message transmission control list set by the second terminal node according to the second terminal node identification, query whether the first terminal node identification exists in the message transmission control list or not according to the first terminal node identification, and when the query result is yes, not send the first message to the second terminal node;

wherein, the message transmission control list is acquired from the first location node.

To solve the above problems, the present invention also provides a terminal node register method, and the method comprises:

a second terminal node sending a registration request message to a second access node, wherein, the registration request message comprises at least a second terminal node identification, the second access node forwarding the registration request message to a first location node; and the first location node querying a message transmission control list set by the second terminal node according to the second terminal node identification, and sending the queried message transmission control list to the second access node, wherein, the message transmission control list comprises the identification of at least another terminal node, so that the second access node can prevent other terminal nodes from sending messages to the second terminal node based on the message transmission control list.

To solve the aforementioned problem, the present invention also provides a terminal node register system, comprising: a second terminal node, a second access node and a first location node, wherein:

the second terminal node is set to: send a registration request message to the second access node, wherein, the registration request message comprises at least a second terminal node identification, the second access node forwards the registration request message to the first location node;

the first location node is set to: query a message transmission control list set by the second terminal node according to the second terminal node identification, and send the queried message transmission control list to the second access node, wherein, the message transmission control list comprises the identification of at least another terminal node, so that the second access node prohibits other terminal nodes from sending messages to the second terminal node based on the message transmission control list.

To solve the aforementioned problem, the present invention also provides a location node, which comprises:

a registration request message receiving module, which is set to: receive a registration request message sent by a second terminal node and forwarded by a second access node, wherein, the registration request message comprises at least a second terminal node identification; and a message transmission control list sending module, which is set to: query the message transmission control list set by the second terminal node according to the second terminal node identification, and send the queried message transmission control list to the second access node, wherein, the message transmission control list comprises the identification of at least one of other terminal nodes, so that the second access node prohibits other terminal nodes from sending messages to the second terminal node based on the message transmission control list.

To solve the aforementioned problem, the present invention also provides a message transmission control register method used to achieve registering of a second terminal node, wherein, the second terminal node registers to a second access node in a first region, and the second terminal node sets a message transmission control list set in a first location node, and the method comprises:

when the second terminal node roams to a second region being different from the first region and comprising at least a third access node, the second terminal node sending a registration request message to the third access node, wherein, the registration request message comprises at least a second terminal node identification, and the third access node forwarding the registration request message to the first location node;

the first location node querying the message transmission control list set by the second terminal node according to the second terminal node identification, and sending the queried message transmission control list to the third access node; and when the message transmission control list is empty, the third access node deleting the message transmission control list stored locally; and when the message transmission control list comprises the identification of at least one of other terminal nodes, the third access node prohibiting other terminal nodes from sending messages to the second terminal node based on the message transmission control list.

To solve the aforementioned problem, the present invention also provides a message transmission control register system used to achieve registration of a second terminal node, the second terminal node registering to a second access node in a first region, and the second terminal node setting a message transmission control list in a first location node, wherein:

the second terminal node is set to: when roaming to a second region being different from the first region and comprising at least a third access node, send a registration request message to the third access node, wherein, the registration request message comprises at least a second terminal node identification;

the third access node is set to: forward the registration request message to the first location node; and receive the message transmission control list sent from the first location node, and when the message transmission control list is empty, delete the message transmission control list locally stored; and when the message transmission control list comprises the identification of at least one of other terminal nodes, prohibit other terminal nodes from sending messages to the second terminal node based on the message transmission control list;

the first location node is set to: query the message transmission control list set by the second terminal node according to the second terminal node identification, and send the queried message transmission control list to the third access node.

To solve the aforementioned problem, the present invention also provides a network access device, which comprises:

a registration request message transceiver module, which is set to: when a second terminal node roams to a second region being different from a first region and comprising at least the network access device, receive a registration request message sent by the second terminal node, wherein, the registration request message comprises at least a second terminal node identification, and forward the registration request message to the first location node;

a receiving filtering module, which is set to: receive the message transmission control list sent by the first location node, and when the message transmission control list is empty, delete the message transmission control list stored locally; and when the message transmission control list comprises the identification of at least one of other terminal nodes, prohibit other terminal nodes from sending messages to the second terminal node based on the message transmission control list.

To solve the aforementioned problem, the present invention also provides a message transmission control list update method used to achieve updating a message transmission control list set by a second terminal node in a first location node, and the method comprising:

when the second terminal node updates the message transmission control list in the first location node, the first location node storing the updated message transmission control list, and querying an access node to which the second terminal node currently registers;

the first location node sending a message transmission control list update message to the queried access node to which the second terminal node currently registers, wherein, the message transmission control list update message carries the updated message transmission control list; and the access node receiving the message transmission control list update message; when the updated message transmission control list in the message transmission control list update message is empty, the access node deleting the message transmission control list; when the updated message transmission control list is not empty, the access node achieving control of the messages sent to the second terminal node based on the updated message transmission control list.

To solve the aforementioned problem, the present invention also provides a message transmission control list update system used to achieve updating a message transmission control list set by a second terminal node in a first location node, wherein:

the first location node is set to: when the second terminal node updates the message transmission control list, store the updated message transmission control list, and query an access node to which the second terminal node currently registers; and send a message transmission control list update message to the queried access node to which the second terminal node currently registers, wherein, the message transmission control list update message carries the updated message transmission control list, and the access node receives the message transmission control list;

the access node is set to: receive the message transmission control list update message sent by the first location node, and when the updated message transmission control list in the message transmission control list update message is empty, the access node deletes the message transmission control list; when the updated message transmission control list is not empty, the access node achieves control of the messages sent to the second terminal node based on the updated message transmission control list.

To solve the aforementioned problem, the present invention also provides a location node, which comprises:

an updating module, which is set to: after a second terminal node updates a message transmission control list, store the updated message transmission control list; and an updated message transmitting module, which is set to: query an access node to which the second terminal node currently registers; and send a message transmission control list update message to the queried access node to which the second terminal node currently registers, wherein, the message transmission control list update message carries the updated message transmission control list.

To solve the aforementioned problem, the present invention also provides a network access device, which comprises:

an updated message receiving module, which is set to: after a second terminal node updates a message transmission control list, receive a message transmission control list update message sent by a location node, wherein, the message transmission control list update message carries the updated message transmission control list; and an updating module, which is set to: when the updated message transmission control list in the message transmission control list update message is empty, the access node deletes the message transmission control list; when the updated message transmission control list is not empty, the access node achieves control of messages sent to the second terminal node based on the updated message transmission control list.

In summary, the present invention has the following technical effects:

1) the control of the message transmission control list is implemented in the access server of the wireless network in the present invention, thus avoiding the wireless resource waste and the subscriber charge loss;

2) the message transmission control list is stored in the mobile subscriber's location server, the roaming and handover of the mobile data subscriber are supported, and the control of the message transmission control list is not affected by the roaming and handover of the calling party or the called party;

3) the message transmission control list may be set by the subscribers themselves, and only works on the subscribers themselves;

4) the message transmission control list may be added or deleted real-time, and takes immediate action;

5) the forwarding control of the mobile packet service data message is implemented, which is not limited to the short message service.

PREFERRED EMBODIMENTS OF THE PRESENT INVENTION

Figure 1:
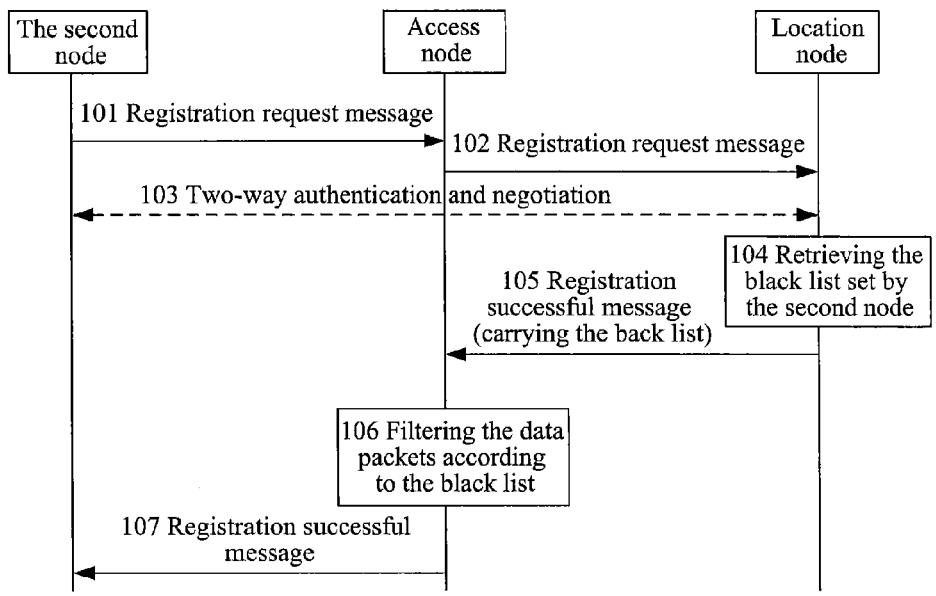
FIG. 1 is a flow chart of a method for processing the message transmission control list when the mobile terminal registers in the present invention.

The main purpose of the present invention is that, after a mobile terminal (MT) passes a normal registration, regardless the MT accesses in its home region or roaming region, the access node (AS) to which the MT accesses can control the data sent to the mobile terminal according to the message transmission control list, so as to avoid the loss or ineffectiveness of the message transmission control list when the MT roams from one access node to another access node, and to avoid the wireless resource waste and the MT charge loss caused by the implementation of the control in the MT.

The message transmission control list in this example can be either a white list or a black list, if it is a black list, the AS filters the data sent by the subscribers in the black list according to the black list; if it is a white list, the AS sends the data sent by the subscribers in the white list to the mobile terminal according to the white list. The method for implementing the black list control is similar to that of the white list control, and the example only takes the black list control to describe.

The basic idea of the present invention is that, the black list set by the terminal is stored in the location node (LS), which may be HLR, HSS, home agent (HA), or other server storing the subscriber location, when the terminal registers to the LS, the LS sends the black list to the AS to which the terminal accesses, wherein, the AS may be the Gateway GPRS Support Node (GGSN), the Serving GPRS Support Node (SGSN), the Packet Data Serving Node (PDSN) and the foreign agent (FA). The AS achieves the black list control and discards the data messages sent by a terminal in the black list to another terminal to which the black list belongs.

When roaming to another AS to access, the terminal registers via the roaming AS, and the LS sends the black list of the terminal to the roaming AS, then after receiving the black list, the roaming AS discards or shields the downlink data messages according to the black list, so that the data messages from the attacker will not take up the wireless bandwidth and waste the wireless resources of the terminals.

When the subscriber modifies or deletes the black list, the black list in the LS is updated, and the LS retrieves the terminal location, and sends the updated black list to the access server where the terminal is located, the access server updates the black list of the terminal and achieves the black list control.

In the following, the specific embodiments of the present invention are described with combination of the accompanying drawings.

It is assumed that the MT1 is the attacker, that is, the calling terminal (initiator) of the junk data or malicious data, and the MT2 is the called terminal (receiver) of the junk data or malicious data, the Subscriber Identifications (SID) of the MT1 and the MT2 for transmitting data messages in the network are respectively SID1 and SID2. The attacker MT1 has initiated or is initiating an attack against the called MT2, and the called MT2 has perceived the attack from the calling MT1, and expects to add the SID1 of the calling MT1 to the black list and not receive the data message whose source identification is the SID1.

In the specific implementation of the present invention, the terminal reports the black list to the LS by using the WEB interface or specific message.

In the following examples, it is supposed that the subscriber reports the black list via the specific message or sets the black list in the WEB page, the black list is sent to the LS, and multiple control processes are triggered.

EXAMPLE 1

FIG. 1 is the method for the location node LS and the access node AS processing the black list set by the MT1 when the subscriber executes the location registration for the first time, comprising:

101, the MT2 (the second terminal node) sending a registration request message to the AS (the second access node) to which the MT2 belongs, wherein, the registration request message comprises the MT2 identification (SID2);

102, after the AS to which the MT2 belongs receives the registration request message, the AS querying for the location of the LS to which the MT2 belongs according to the SID2, and forwards the registration request message to the queried LS (the first location node);

wherein, the AS stores the SID-LS corresponding table, and determines which LS the MT information identified with the SID2 is stored according to the corresponding table.

103, performing two-way authentication and negotiation between the terminal and the LS as needed, if the authentication is not passed, ending the process; otherwise proceeding to the next step;

this step may be performed or not according to the difference of the systems.

104, the LS checking whether the MT2 is a legal subscriber or not according to the SID2 of the MT2, if it is a legal subscriber, retrieving the black list corresponding to the SID2 in the database;

105, the first location node returning a registration successful response to the second access node to which the MT2 belongs, wherein, the registration successful response comprises the black list set by the MT2, and the black list comprises the SIDs of one or more of the callers;

106, after receiving the registration successful response sent by the first location node, the second access node checking whether the black list contained in the registration successful response is empty or not, if the black list is not empty, filtering the data messages based on the black list to prevent the data of the MT in the black list from sending to the MT2 via the AS;

107, the second access node forwarding the registration successful message to the MT2, wherein, the registration successful message does not comprise a black list.

EXAMPLE 2

Figure 2:
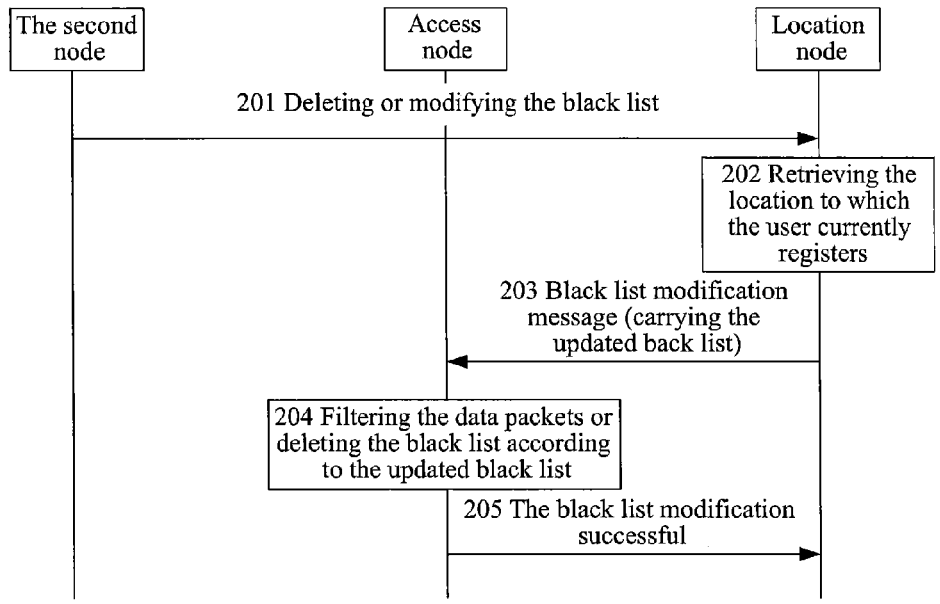
FIG. 2 is a flow chart of a method for modifying or deleting the message transmission control list in the present invention.

FIG. 2 shows the process of modifying or deleting the black list (adding or removing the SID in the black list) after the subscriber initially registers or roams to a new location to register, the LS sends the updated black list to the AS based on the modification of the black list by the subscriber so that the AS uses the updated black list to control, comprising:

201, the MT2 requesting the LS to modify or delete the black list via the WEB interface or the message transmission control list request message;

202, the LS modifying or deleting the black list for the MT2 according to the received message transmission control list request message or the WEB interface settings, and retrieving the location where the MT2 currently registers (the identification of the AS to which the MT1 currently accesses);

after each time when the subscriber accesses to a AS, the AS to which the subscriber accesses reports the subscriber's SID and its own identification to the LS;

203, the LS sending the black list modification message to the AS to which the MT2 accesses, wherein, the black list modification message carries the updated black list, if the carried black list is empty, it means that the LS requires the AS to delete all the black lists stored for the MT1;

204, the AS to which the MT2 accesses filtering the data messages or removing the black list of MT2 according to the updated black list;

205, the AS to which the MT2 accesses blocking the data messages sent by the mobile terminals in the updated black list, and returning the black list modification successful message to the LS.

EXAMPLE 3

Figure 3:
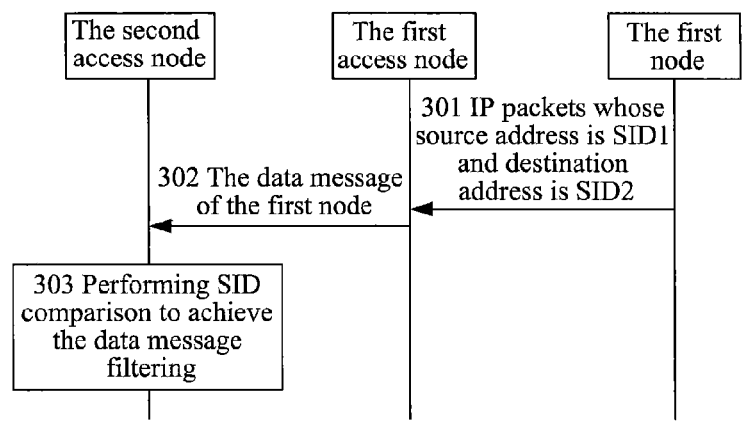
FIG. 3 is a flow chart of a method for data shielding according to the message transmission control list in the present invention.

FIG. 3 is the process of the AS to which the MT2 (the second terminal node) accesses blocking the data messages, whose source subscriber identification is SID1 and destination subscriber identification is SID2, sent by the MT1 (the first terminal node) which is in the MT2 black list after the MT2 set the black list, wherein, the MT1 and the MT2 respectively register to the AS1 (the first access node) and the AS2 (second access node), comprising:

301, the MT1 sending the data message (first message), whose source subscriber ID is SID1 and destination subscriber ID is SID2, to the AS1;

302, the AS1 querying for the location of the AS2 to which the SID2 accesses and forwarding the data messages of the MT1 to the AS2 to which the MT2 accesses;

in the process of the AS1 forwarding to the AS2, the original data message may be encapsulated with a new data message header (the second message) to be forwarded or may be directly forwarded (the first message);

303, the AS2 retrieving the destination identification of the received data message, searching out the black list corresponding to the MT2 according to the destination identification, retrieving the source SID of the data message, comparing the source SID with the subscriber identifications in the black list, if it is found that the source SID exists in the black list, discarding the data message; if the source SID is not in the black list, sending the data message to the MT2;

wherein, the AS2 may acquire the black list from the LS before the MT1 sends the first message or after the first or second message is received.

Of course, the MT1 and the MT2 may belong to the same AS, in this case, the first data message sent by the MT2 does not need to be forwarded via the AS, and the AS to which both the MT1 and the MT2 belong queries for whether the MT1 identification is in the black list of MT2 or not, and selects the next operation based on the query results, if the MT1 identification is included in the black list of the MT2, does not send the first message of MT1 to the MT2.

EXAMPLE 4

Figure 4:
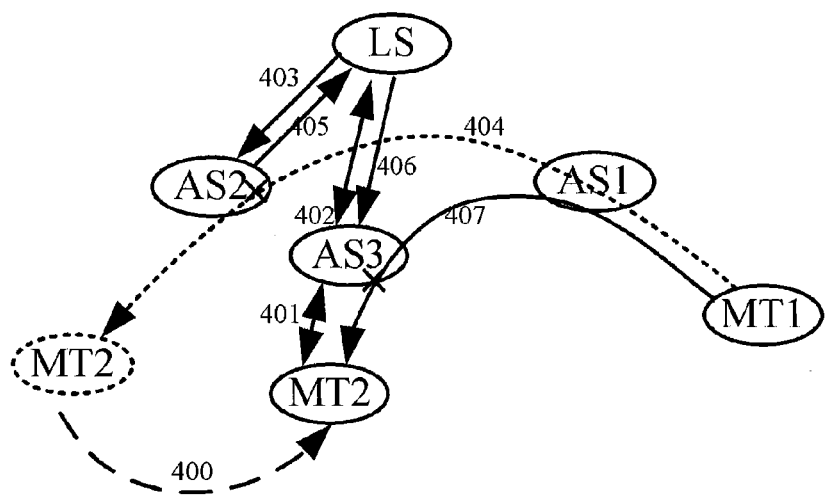
FIG. 4 is the switching process of the message transmission control list control function when the terminal MT1 roams from the AS1 to the AS2 in the present invention.

FIG. 4 shows the process of the MT2 black list control function switched from the AS2 to the AS3 (third access node) when the mobile terminal MT2 roams between the two ASs, the specific process comprising: the LS (first location node) notifies the AS2 to delete the black list set by the MT2, the AS2 removes the control of the black list set by the MT2, the LS notifies the AS3 to establish the black list set by the MT2, and the AS3 establishes and implements the process of controlling the black list set by the MT2.

400, the MT2 roams from the AS2 region to the AS3 region.

401, the MT2 initiates a registration request message to the AS3 (there are processes currently in use), and the registration request message comprises the MT2 identification.

402, the AS3 forwards the registration request message to the LS to initiate the location registration and authentication of the MT2 (there are processes currently in use).

403, the LS notifies the AS2 to remove the black list set by the MT2 (refer to 202, 203).

404, the AS2 deletes the black list control set by the MT2 (refer to 204, 205).

405, the AS2 notifies the MT2 that the set LS black list has been successfully removed (refer to 205).

406, the LS queries the black list set by the MT2, and notifies the AS3 of the black list set by the MT2 (refer to 104, 105), and when the black list is empty, the AS3 deletes the locally stored black list, and when the black list comprises the identification of at least one of other terminal nodes, the AS3 is used to prohibit other terminal nodes from sending messages to the MT2 based on the black list.

407, the AS3 achieves the control based on the black list set by the MT2.

When the MT2 updates the message transmission control list in the first location node, the first location node stores the updated message transmission control list, and queries for the access node to which the MT1 currently registers.

The first location node sends the message transmission control list update message to the queried access node to which the second terminal node currently registers, and the message carries the updated message transmission control list, and the access node receives the message transmission control list; wherein, when the message transmission control list is empty, the access node deletes the message transmission control list; otherwise, the access node controls the messages sent to the second terminal node based on the updated message transmission control list.

The present invention further provides a message transmission control system, comprising: a terminal node, an access node and a location node, wherein:

the location node is set to: store a message transmission control list of the terminal node, and after receiving a request from the access node, search for the message transmission control list of the terminal node, and send to the access node;

the access node is set to: after the terminal node finishes registration, request the location node to send the message transmission control list of the terminal node; and after receiving the message transmission control list of the terminal node, filter data messages sent to the terminal node according to the message transmission control list.

The message transmission control list comprises one or more subscriber identifications (SIDs);

the access node is set to filter the data messages sent to the terminal node according to the following way:

after receiving the data message, the access node retrieving the destination SID of the data message, and searching out the corresponding message transmission control list according to the destination SID;

retrieving the source SID of the data message, and comparing the source SID with the SIDs in the message transmission control list, if the source SID exists in the message transmission control list, discarding the received data message.

The location node is further set to: modify the stored message transmission control list of the terminal node, and send the modified message transmission control list to the access node to which the corresponding terminal node accesses;

the access node is further set to: filter the data messages according to the modified message transmission control list.

The location of node is further set to: delete the stored message transmission control list of the terminal node, and send an empty message transmission control list to the access node to which the corresponding terminal node accesses;

the access node is further set to: after receiving the empty message transmission control list, delete the stored message transmission control list and cancel filtering of the data messages.

The access node is further set to request the location node to send the message transmission control list of the terminal node by forwarding a registration request message of the terminal node to the location node;

the location node is further set to send the message transmission control list of the terminal node to the access node via a registration successful message.

The present example also provides a network access device, which comprises:

a terminal node registering module, which is set to: complete the registration of the terminal node;

a transmission requesting module, which is set to: after the terminal node finishes the registration, request a location node which stores a message transmission control list of the terminal node to send the message transmission control list of the terminal node; and a receiving filtering module, which is set to: after receiving the message transmission control list of the terminal node, filter data messages sent to the terminal node according to the message transmission control list.

The message transmission control list comprises one or more subscriber identifications (SIDs);

the receiving filtering module is set to filter the data messages sent to the terminal node according to the following way:

after receiving the data message, the receiving filtering module retrieving the destination SID of the data message, and searching out the corresponding message transmission control list according to the destination SID;

retrieving the source SID of the data message, and comparing the source SID with the SDs in the message transmission control list, if the source SID exists in the message transmission control list, discarding the received data message.

The receiving filtering module is further set to: after receiving a modified message transmission control list sent by the location node after the location node modifies the stored message transmission control list of the terminal node, filter the data messages according to the modified message transmission control list.

The receiving filtering module is further set to: after receiving an empty message transmission control list sent to the network access device after the location node deletes the stored message transmission control list of the terminal node, delete the stored message transmission control list and cancel filtering of the data messages.

The transmission requesting module is set to request the location node to send the message transmission control list of the terminal node by forwarding a registration request message of the terminal node to the location node.

The second message transmission control system provided in the present invention is used to achieve the message transmission control between the first terminal node and the second terminal node, the first terminal node registering to the first access node, and the second terminal node registering to the second access node, wherein:

the first terminal node is set to: send a first message to the second terminal node via the first access node, and the first message comprises at least a first terminal node identification and a second terminal node identification;

the first access node is set to: receive the first message and forward the first message to the second access node according to the second terminal node identification;

the second access node is set to: query a message transmission control list set by the second terminal node according to the second terminal node identification, and query whether the first terminal node identification exists in the message transmission control list or not according to the first terminal node identification, and determine whether to send the first message to the second terminal node or not based on the query results.

This example also provides a network access device, and the network access device is used to achieve message transmission control between a first terminal node and a second terminal node, the network access device is set to:

when the first terminal node registers to the network access device, receive a first message sent by the first terminal node to the second terminal node via the network access device, wherein, the first message comprises at least a first terminal node identification and a second terminal node identification, and forward the first message to the network access device to which the second terminal node registers according to the second terminal node identification; and when the second terminal node registers to the network access device, receive the first message sent from the network access device to which the first terminal node registers, query a message transmission control list set by the second terminal node according to the second terminal node identification, and query whether the first terminal node identification exists in the message transmission control list or not according to the first terminal node identification, and determine whether to send the first message to the second terminal node or not based on the query results.

The third message transmission control system provided in the present invention is used to achieve the message transmission control between the first terminal node and the second terminal node, and the first terminal node registers to the first access node, the second terminal node registers to the second access node, and the second terminal node sets the message transmission control list in the first location node, wherein:

the first terminal node is set to: send a first message to the second terminal node via the first access node, wherein, the first message comprises at least a first terminal node identification and a second terminal node identification;

the first access node is set to: receive the first message and forward the first message to the second access node according to the second terminal node identification; or the first access node is set to receive the first message and update the first message to a second message, forward the second message to the second access node according to the second terminal node identification;

the second access node is set to: query the message transmission control list set by the second terminal node according to the second terminal node identification, and query whether the first terminal node identification exists in the message transmission control list or not according to the first terminal node identification, and determine whether to send the first message to the second terminal node or not based on the query results, or determine whether to send the second message to the second terminal node or not based on the query results, wherein, the message transmission control list of the second access node is obtained from the first location node.

The fourth message transmission control system provided in the present invention is used to achieve the message transmission control between the first terminal node and the second terminal node, and the first terminal node and the second terminal node register to the same access node, and the second terminal node sets the message transmission control list in the first location node, wherein:

the first terminal node is set to: send a first message to the second terminal node via the access node, wherein, the first message comprises at least a first terminal node identification and a second terminal node identification;

the access node is set to: receive the first message, query the message transmission control list set by the second terminal node according to the second terminal node identification, query whether the first terminal node identification exists in the message transmission control list or not according to the first terminal node identification, and when the query result is yes, not send the first message to the second terminal node;

wherein, the message transmission control list is acquired from the first location node.

A terminal node register system further provided in the present invention comprises: a second terminal node, a second access node and a first location node, wherein:

the second terminal node is set to: send a registration request message to the second access node, wherein, the registration request message comprises at least a second terminal node identification, the second access node forwards the registration request message to the first location node;

the first location node is set to: query a message transmission control list set by the second terminal node according to the second terminal node identification, and send the queried message transmission control list to the second access node, wherein, the message transmission control list comprises the identification of at least another terminal node, so that the second access node prohibits other terminal nodes from sending messages to the second terminal node based on the message transmission control list.

This example also provides a location node, which comprises:

a registration request message receiving module, which is set to: receive a registration request message sent by a second terminal node and forwarded by a second access node, wherein, the registration request message comprises at least a second terminal node identification; and a message transmission control list sending module, which is set to: query the message transmission control list set by the second terminal node according to the second terminal node identification, and send the queried message transmission control list to the second access node, wherein, the message transmission control list comprises the identification of at least one of other terminal nodes, so that the second access node prohibits other terminal nodes from sending messages to the second terminal node based on the message transmission control list.

The present invention provides a message transmission control register system used to achieve registration of a second terminal node, the second terminal node registering to a second access node in a first region, and the second terminal node setting a message transmission control list in a first location node, wherein:

the second terminal node is set to: when roaming to a second region being different from the first region and comprising at least a third access node, send a registration request message to the third access node, wherein, the registration request message comprises at least a second terminal node identification;

the third access node is set to: forward the registration request message to the first location node; and receive the message transmission control list sent from the first location node, and when the message transmission control list is empty, delete the message transmission control list locally stored; and when the message transmission control list comprises the identification of at least one of other terminal nodes, prohibit other terminal nodes from sending messages to the second terminal node based on the message transmission control list;

the first location node is set to: query the message transmission control list set by the second terminal node according to the second terminal node identification, and send the queried message transmission control list to the third access node.

The present embodiment also provides a network access device, which comprises:

a registration request message transceiver module, which is set to: when a second terminal node roams to a second region being different from a first region and comprising at least the network access device, receive a registration request message sent by the second terminal node, wherein, the registration request message comprises at least a second terminal node identification and a routing identification of a network access device to which the second terminal node registers before the roaming, and forward the registration request message to the first location node;

a receiving filtering module, which is set to: receive the message transmission control list sent by the first location node, and when the message transmission control list is empty, delete the message transmission control list stored locally; and when the message transmission control list comprises the identification of at least one of other terminal nodes, prohibit other terminal nodes from sending messages to the second terminal node based on the message transmission control list.

The present invention also provides a message transmission control list update system used to achieve updating a message transmission control list set by a second terminal node in a first location node, wherein:

the first location node is set to: when the second terminal node updates the message transmission control list, store the updated message transmission control list, and query an access node to which the second terminal node currently registers; and send a message transmission control list update message to the queried access node to which the second terminal node currently registers, wherein, the message transmission control list update message carries the updated message transmission control list, and the access node receives the message transmission control list;

the access node is set to: receive the message transmission control list update message sent by the first location node, and when the updated message transmission control list in the message transmission control list update message is empty, the access node deletes the message transmission control list; when the updated message transmission control list is not empty, the access node achieves control of the messages sent to the second terminal node based on the updated message transmission control list.

The present embodiment also provides a location node, which comprises:

an updating module, which is set to: after a second terminal node updates a message transmission control list, store the updated message transmission control list; and an updated message transmitting module, which is set to: query an access node to which the second terminal node currently registers; and send a message transmission control list update message to the queried access node to which the second terminal node currently registers, wherein, the message transmission control list update message carries the updated message transmission control list, so that the access node may update the message transmission control list.

The present invention also provides a network access device, which comprises:

an updated message receiving module, which is set to: after a second terminal node updates a message transmission control list, receive a message transmission control list update message sent by a location node, wherein, the message transmission control list update message carries the updated message transmission control list; and an updating module, which is set to: when the updated message transmission control list in the message transmission control list update message is empty, the access node deletes the message transmission control list; when the updated message transmission control list is not empty, the access node achieves control of messages sent to the second terminal node based on the updated message transmission control list.

Industrial Applicability

The control of the message transmission control list is implemented in the access server of the wireless network in the present invention, thus avoiding the wireless resource waste and the subscriber charge loss; moreover, the message transmission control list is stored in the mobile subscriber's location server, the roaming and handover of the mobile data subscriber are supported, and the control of the message transmission control list is not affected by the roaming and handover of the calling party or the called party; in addition, in the present invention, the message transmission control list may be set by the subscribers themselves, and only works on the subscribers themselves; the message transmission control list may be added or deleted real-time, and takes immediate action; the forwarding control of the mobile packet service data message is implemented, which is not limited to the short message service.

What is claimed is:

1. A message transmission control method, comprising:
a first location node storing a message transmission control list of a second terminal node;
after the second terminal node registers to a second access node, the second access node requesting the first location node to send the message transmission control list of the second terminal node;
the first location node searching for the message transmission control list of the second terminal node, and sending to the second access node; and after receiving the message transmission control list of the second terminal node, the second access node filtering data messages sent to the second terminal node according to the message transmission control list;
wherein when the second terminal node registers to another access node afterwards, said first location node further sends said message transmission control list of the second terminal node to said another access node;
wherein the message transmission control list comprises one or more subscriber identifications (SID);
the step of the second access node filtering the data messages sent to the second terminal node comprises:
after receiving the data message, the second access node searching out the corresponding message transmission control list according to the destination SID of the data message; and
comparing the source SID of the data message with the SIDs in the message transmission control list: if the source SID exists in the message transmission control list, discarding the received data message;
thereby data messages sent from terminals whose SIDs are in said message transmission control list of the second terminal node to the second terminal node are discarded by the second access node;
wherein a subscriber of the second terminal node is able to modify or delete said message transmission control list of the second terminal node, when the subscriber modifies the message transmission control list, the message transmission control list in the first location node is updated, and the first location node retrieves a location of the second terminal node, and sends the updated message transmission control list to the access node where the second terminal node is located, said access node updates the message transmission control list of the second terminal node and filters data messages according to the updated message transmission control list.

2. The method of claim 1, wherein, after the step of the first location node storing the message transmission control list of the second terminal node, the method further comprises:
deleting the message transmission control list stored in the first location node;
the first location node sending an empty message transmission control list to an access node to which the second terminal node currently accesses; and
after receiving the empty message transmission control list, the access node deleting the stored message transmission control list of the second terminal node, and removing the filtering of the data messages sent to the second terminal node.

3. The method of claim 1, wherein:
the second access node requests the first location node to send the message transmission control list of the second terminal node by forwarding a registration request message of the second terminal node to the first location node;
the first location node sends the message transmission control list of the second terminal node to the second access node via a registration successful message.

4. A message transmission control system, comprising: a second terminal node comprising a hardware processor, a second access node comprising a hardware processor and a first location node comprising a hardware processor, wherein:
the first location node is set to: store a message transmission control list of the second terminal node, and after receiving a request from the second access node, search for the message transmission control list of the second terminal node, and send to the second access node;
the second access node is set to: after the second terminal node finishes registration, request the first location node to send the message transmission control list of the second terminal node; and after receiving the message transmission control list of the second terminal node, filter data messages sent to the second terminal node according to the message transmission control list;
wherein when the second terminal node registers to another access node afterwards, said first location node further sends said message transmission control list of the second terminal node to said another access node;
wherein the message transmission control list comprises one or more subscriber identifications (SID);
the second access node filters the data messages sent to the second terminal node comprises:
after receiving the data message, the second access node searching out the corresponding message transmission control list according to the destination SID of the data message; and
comparing the source SID of the data message with the SIDs in the message transmission control list: if the source SID exists in the message transmission control list, discarding the received data message;
thereby data messages sent from terminals whose SIDs are in said message transmission control list of the second terminal node to the second terminal node are discarded by the second access node;
wherein a subscriber of the second terminal node is able to modify or delete said message transmission control list of the second terminal node, when the subscriber modifies the message transmission control list, the message transmission control list in the first location node is updated, and the first location node retrieves a location of the second terminal node, and sends the updated message transmission control list to the access node where the second terminal node is located, said access node updates the message transmission control list of the second terminal node and filters data messages according to the updated message transmission control list.

5. A network access device, comprising a hardware processor that is configured to perform steps in the following modules:
a terminal node registering module, which is set to: complete the registration of the terminal node;
a transmission requesting module, which is set to: after the terminal node finishes the registration, request a location node which stores a message transmission control list of the terminal node to send the message transmission control list of the terminal node; and
a receiving filtering module, which is set to: after receiving the message transmission control list of the terminal node, filter data messages sent to the terminal node according to the message transmission control list;
wherein when the terminal node registers to another access node device afterwards, said location node further sends said message transmission control list of the terminal node to said another access node device;
wherein the message transmission control list comprises one or more subscriber identifications (SID);
filtering the data messages sent to the terminal node comprises:
after receiving the data message, searching out the corresponding message transmission control list according to the destination SID of the data message; and
comparing the source SID of the data message with the SIDs in the message transmission control list: if the source SID exists in the message transmission control list, discarding the received data message;

thereby data messages sent from terminals whose SIDs are in said message transmission control list of the terminal node to the terminal node are discarded by the network access device;

wherein a subscriber of the terminal node is able to modify or delete said message transmission control list of the terminal node, when the subscriber modifies the message transmission control list, the message transmission control list in the location node is updated, and the location node retrieves a location of the terminal node, and sends the updated message transmission control list to the access node where the terminal node is located, said access node updates the message transmission control list of the terminal node and filters data messages according to the updated message transmission control list.

6. The method of claim 1, further comprising:

a first terminal node which registers to a first access node sending a first message to the second terminal node via the first access node, and the first message comprises at least the first terminal node identification and the second terminal node identification;

the first access node receiving the first message and forwarding the first message to the second access node according to the second terminal node identification; and the second access node querying for the message transmission control list of the second terminal node according to the second terminal node identification, and checking whether the first terminal node identification exists in the message transmission control list or not according to the first terminal node identification, and determining whether to send the first message to the second terminal node or not based on the check result.

7. The system of claim 4, further comprising a first terminal node comprising a hardware processor and a first access node comprising a hardware processor, the first terminal node registering to the first access node, wherein:

the first terminal node is set to: send a first message to the second terminal node via the first access node, and the first message comprises at least the first terminal node identification and the second terminal node identification;

the first access node is set to: receive the first message and forward the first message to the second access node according to the second terminal node identification;

the second access node is set to: query for the message transmission control list of the second terminal node according to the second terminal node identification, and check whether the first terminal node identification exists in the message transmission control list or not according to the first terminal node identification, and determine whether to send the first message to the second terminal node or not based on the check result.

8. The device of claim 5, the processor of the device is further configured to perform the following steps:

when a first terminal node registers to the network access device, receive a first message sent by the first terminal node to a second terminal node via the network access device, wherein, the first message comprises at least the first terminal node identification and the second terminal node identification, and forward the first message to a network access device to which the second terminal node registers according to the second terminal node identification;

when the second terminal node registers to the network access device, receive the first message sent from the network access device to which the first terminal node registers, query for the message transmission control list of the second terminal node according to the second terminal node identification, and check whether the first terminal node identification exists in the message transmission control list or not according to the first terminal node identification, and determine whether to send the first message to the second terminal node or not based on the check result.

9. The system of claim 4, further comprising a first terminal node comprising a hardware processor and a first access node comprising a hardware processor, the first terminal node registering to the first access node, wherein:

the first terminal node is set to: send a first message to the second terminal node via the first access node, wherein, the first message comprises at least the first terminal node identification and the second terminal node identification;

the first access node is set to: receive the first message and forward the first message to the second access node according to the second terminal node identification; or the first access node is set to receive the first message and update the first message to a second message, forward the second message to the second access node according to the second terminal node identification;

the second access node is set to: query for the message transmission control list of the second terminal node according to the second terminal node identification, and check whether the first terminal node identification exists in the message transmission control list or not according to the first terminal node identification, and determine whether to send the first message to the second terminal node or not based on the check result, or determine whether to send the second message to the second terminal node or not based on the check result.

10. The method of claim 1, further comprising:

the second terminal node sending a registration request message to the second access node, wherein, the registration request message comprises at least the second terminal node identification, the second access node forwarding the registration request message to the first location node; and the first location node querying for the message transmission control list of the second terminal node according to the second terminal node identification, and sending the queried message transmission control list to the second access node, wherein, the message transmission control list comprises the identification of at least another terminal node, so that the second access node can prevent other terminal nodes from sending messages to the second terminal node based on the message transmission control list.

11. The registering method of claim 10, wherein:

the step of sending the queried message transmission control list to the second access node comprises: the first location node returning a registration successful response to the second access node, wherein, the registration successful response comprises the message transmission control list;

after the step of sending the queried message transmission control list to the second access node, the method further comprises: the second access node sending a registration successful response to the second terminal node, wherein, the registration successful response does not comprise the message transmission control list.

12. The registering method of claim 10, wherein, the method further comprises:
the second terminal node processes the message transmission control list by sending a message transmission control list request message to the first location node, wherein, the request message comprises at least one of the followings: adding, deleting.

13. The system of claim 4, wherein:
the second terminal node is further set to: send a registration request message to the second access node, wherein, the registration request message comprises at least the second terminal node identification, the second access node forwards the registration request message to the first location node;
the first location node is further set to: query for the message transmission control list of the second terminal node according to the second terminal node identification, and send the queried message transmission control list to the second access node, wherein, the message transmission control list comprises the identification of at least another terminal node, so that the second access node prohibits other terminal nodes from sending messages to the second terminal node based on the message transmission control list.

14. The system of claim 4, wherein the processor of the first location node is configured to perform steps in the following modules:
a registration request message receiving module, which is set to: receive a registration request message sent by the second terminal node and forwarded by the second access node, wherein, the registration request message comprises at least the second terminal node identification; and
a message transmission control list sending module, which is set to: query for the message transmission control list of the second terminal node according to the second terminal node identification, and send the queried message transmission control list to the second access node, wherein, the message transmission control list comprises the identification of at least one of other terminal nodes, so that the second access node prohibits other terminal nodes from sending messages to the second terminal node based on the message transmission control list.

15. The method of claim 1, wherein the second access node locates in a first region, and the method further comprises:
when the second terminal node roams to a second region being different from the first region and comprising at least a third access node, the second terminal node sending a registration request message to the third access node, wherein, the registration request message comprises at least the second terminal node identification, and the third access node forwarding the registration request message to the first location node;
the first location node querying for the message transmission control list of the second terminal node according to the second terminal node identification, and sending the queried message transmission control list to the third access node; and
when the message transmission control list is empty, the third access node deleting the message transmission control list stored locally; and when the message transmission control list comprises the identification of at least one of other terminal nodes, the third access node prohibiting other terminal nodes from sending messages to the second terminal node based on the message transmission control list.

16. The system of claim 4, wherein the second access node locates in a first region;
the second terminal node is further set to: when roaming to a second region being different from the first region and comprising at least a third access node, send a registration request message to the third access node, wherein, the registration request message comprises at least the second terminal node identification;
the third access node comprises a hardware processor and is set to: forward the registration request message to the first location node; and receive the message transmission control list sent from the first location node, and when the message transmission control list is empty, delete the message transmission control list locally stored; and when the message transmission control list comprises the identification of at least one of other terminal nodes, prohibit other terminal nodes from sending messages to the second terminal node based on the message transmission control list;
the first location node is further set to: query for the message transmission control list of the second terminal node according to the second terminal node identification, and send the queried message transmission control list to the third access node.

17. The method of claim 1, further comprising:
when the second terminal node updates the message transmission control list in the first location node, the first location node storing the updated message transmission control list, and querying for an access node to which the second terminal node currently registers;
the first location node sending a message transmission control list update message to the queried access node to which the second terminal node currently registers, wherein, the message transmission control list update message carries the updated message transmission control list; and
the access node receiving the message transmission control list update message; when the updated message transmission control list in the message transmission control list update message is empty, the access node deleting the message transmission control list; when the updated message transmission control list is not empty, the access node achieving control of the messages sent to the second terminal node based on the updated message transmission control list.

18. The system of claim 4, wherein:
the first location node is further set to: when the second terminal node updates the message transmission control list, store the updated message transmission control list, and query for an access node to which the second terminal node currently registers; and send a message transmission control list update message to the queried access node to which the second terminal node currently registers, wherein, the message transmission control list update message carries the updated message transmission control list, and the access node receives the message transmission control list;
the access node comprises a hardware processor and is set to: receive the message transmission control list update message sent by the first location node, and when the updated message transmission control list in the message transmission control list update message is empty, the access node deletes the message transmission control list; when the updated message transmission control list is not empty, the access node achieves control of the messages sent to the second terminal node based on the updated message transmission control list.

* * * * *